United States Patent
Cho (10) Patent No.: US 9,723,468 B2
(45) Date of Patent: Aug. 1, 2017

(54) APPARATUS AND METHOD FOR SENDING SOS IN VEHICLE ENGAGED WITH UNINHABITED AERIAL VEHICLE

(71) Applicant: Hyundai Motor Company, Seoul (KR)

(72) Inventor: Sung O Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/151,957

(22) Filed: May 11, 2016

(65) Prior Publication Data

US 2017/0086048 A1   Mar. 23, 2017

(30) Foreign Application Priority Data

Sep. 23, 2015  (KR) .......................... 10-2015-0134556

(51) Int. Cl.

| | | |
|---|---|---|
| H04W 4/00 | (2009.01) | |
| H04W 4/22 | (2009.01) | |
| B64C 39/00 | (2006.01) | |
| G01S 19/17 | (2010.01) | |
| H04W 64/00 | (2009.01) | |
| H04B 17/309 | (2015.01) | |
| G01S 19/13 | (2010.01) | |
| B64C 39/02 | (2006.01) | |
| G05D 1/10 | (2006.01) | |
| B64F 1/10 | (2006.01) | |
| B64D 47/08 | (2006.01) | |

(52) U.S. Cl.

CPC .............. *H04W 4/22* (2013.01); *B64C 39/024* (2013.01); *B64F 1/10* (2013.01); *G01S 19/13* (2013.01); *G05D 1/101* (2013.01); *H04B 17/309* (2015.01); *H04W 64/00* (2013.01); *B64C 2201/122* (2013.01); *B64C 2201/123* (2013.01); *B64C 2201/127* (2013.01); *B64C 2201/145* (2013.01); *B64C 2201/208* (2013.01); *B64D 47/08* (2013.01)

(58) Field of Classification Search
CPC combination set(s) only.
See application file for complete search history.

(56) References Cited

U.S. PATENT DOCUMENTS

| 8,515,609 B2* | 8/2013 | McAndrew .......... G05D 1/0038 244/76 R |
|---|---|---|
| 9,087,451 B1* | 7/2015 | Jarrell .................. G08G 5/0069 |

(Continued)

FOREIGN PATENT DOCUMENTS

| JP | 2006-176050 A | 7/2006 |
|---|---|---|
| JP | 2007112315 A | 5/2007 |

(Continued)

*Primary Examiner* — Yonel Beaulieu
(74) *Attorney, Agent, or Firm* — Brinks Gilson & Lione (57) ABSTRACT

A method of emergency handling is provided for a vehicle engaged with an uninhabited aerial vehicle (UAV). The method can include collecting location information if emergency situation occurs. In emergency situations, the vehicle can determine whether an operation of uninhabited aerial vehicle (UAV) is allowed based on the location information and time information. After determining whether there is a flight space for the operation of uninhabited aerial vehicle (UAV) above a vehicle, the vehicle can transmit at least one of SOS and an emergency call into the uninhabited aerial vehicle (UAV).

19 Claims, 5 Drawing Sheets

(56) References Cited

U.S. PATENT DOCUMENTS

| | | | |
|---|---|---|---|
| 9,398,467 B2* | 7/2016 | Schultz | H04L 63/105 |
| 9,417,325 B1* | 8/2016 | Bry | G01S 13/9303 |
| 9,576,493 B2* | 2/2017 | Jarrell | G08G 5/0069 |
| 2013/0311009 A1* | 11/2013 | McAndrew | G05D 1/0038 |
| | | | 701/3 |
| 2016/0012730 A1* | 1/2016 | Jarrell | G08G 5/0069 |
| | | | 701/8 |
| 2016/0059962 A1* | 3/2016 | Abuelsaad | G08G 1/096716 |
| | | | 701/3 |
| 2016/0332748 A1* | 11/2016 | Wang | B64F 1/00 |

FOREIGN PATENT DOCUMENTS

| | | |
|---|---|---|
| JP | 2015-131713 | 7/2015 |
| KR | 10-2011-0024616 | 3/2011 |
| KR | 10-1350291 B | 1/2014 |
| KR | 10-2014-0030610 | 3/2014 |
| KR | 10-2015-0000053 | 1/2015 |
| WO | 2014-080387 | 5/2014 |
| WO | 2014-080388 A2 | 5/2014 |

\* cited by examiner

APPARATUS AND METHOD FOR SENDING SOS IN VEHICLE ENGAGED WITH UNINHABITED AERIAL VEHICLE

CROSS-REFERENCE TO RELATED APPLICATION

This application claims priority to and the benefit of Korean Patent Application No. 10-2015-0134556, filed on Sep. 23, 2015 in the Korean Intellectual Property Office, the disclosure of which is hereby incorporated by reference as if fully set forth herein.

TECHNICAL FIELD

The disclosure relates to an apparatus and a method for sending a SOS so as to broadcast an accident occurrence with location and accident causes/factors when the accident incurs, in order to prevent human and property damages caused by an auto accident or a lost car, and more particularly, to an apparatus and a method for sending SOS corresponding to emergency in vehicle engaged with an uninhabited aerial vehicle (UAV).

BACKGROUND

In order to prevent human and property damage caused by an auto accident or a lost car, a vehicle can include an emergency device for broadcasting an emergency situation such as a SOS. The emergency device can check a vehicle's state. If confirming that the vehicle is in a case of an emergency (e.g., in excess of a predetermined safety threshold), the emergency device can generate a SOS (or alert signal) informing of an accident occurrence. The SOS (or alert signal) can be transmitted by a wireless communication device. Throughout a wireless communication network, the SOS (or alert signal) can be delivered into an emergency-related (government-related) organization, a service/management company, or the like. When an accident incurs, the emergency device sending the SOS can help coping with the accident more effectively and fast, as compared with a conventional control after fact, which requires driver's, eyewitness', or third-party's report informing a police or a particular rescue crew/organization of the accident.

In March 2014, the European Union determined that all new automobiles should include an emergency call system (eCall) for automatically sending a SOS. It was announced that the European Union has approved plans to install an emergency call feature in all cars and light vans from Mar. 31, 2018. The emergency call system (eCall) is a system for automatically contacting emergency services in the event of a crash, so as to give aid to the injured. The emergency call system (eCall) can transmit vehicle data via a global navigation satellite system (GNSS). A communication device using a subscriber identification module (SIM) card can send to a rescue team near an accident location the vehicle data including a vehicle type, location, operation direction, the number of buckled seat belts, and so on. Further, the emergency call system (eCall) can make an emergency call to 112 in EU (or 911 in US) automatically.

For example, when an accident occurs, the emergency device can sense an airbag signal and transmit a SOS signal that includes GPS information to a call center via a wireless communication network. However, it is assumed that an accident occurs at a propagation shadow region. Even if the emergency device using a wireless communication network transmits SOS at the propagation shadow region, the SOS might not be delivered into an emergency-related organization or a call center. Further, although the SOS is delivered via the wireless communication network, it is possible that GPS or mobile communication device may not provide accurate location information. Those can make that too much time is spent on location search by a police or rescuer (ambulance car).

SUMMARY

An apparatus and a method for use in a vehicle can use an uninhabited aerial vehicle (UAV) to send SOS or to make an emergency call in emergency situations in order to control or handle the emergency situations and to prevent additional damages such as secondary collision. The apparatus and the method can support the SOS or emergency call under even communication network circumstances of which has difficulty to use the SOS or emergency call.

Further, in an emergency system including a vehicle engaged with an uninhabited aerial vehicle (UAV) such as a drone, an apparatus and a method can send SOS or make an emergency call by using the UAV as well as provide more accurate information obtained by data collection devices such as a camera, a display device including a warning light, or the like.

An emergency handling method for a vehicle engaged with an uninhabited aerial vehicle (UAV) can include collecting location information if an emergency situation occurs. Further, the emergency handling method includes determining whether an operation of uninhabited aerial vehicle (UAV) is allowed based on the location information and time information, and determining whether there is a flight space for the operation of uninhabited aerial vehicle (UAV) above a vehicle. At least one of a SOS or an emergency call can be delivered into the uninhabited aerial vehicle (UAV).

The location information is periodically updated by a global positioning system (GPS) device under predetermined circumstance.

In the emergency handling method, the location information based on previous GPS information can be maintained if the signal strength of wireless communication network is equal to or below a predetermined level. Further, the location information can be updated based on current GPS information if the signal strength of wireless communication network is above the predetermined level.

In order to transmit at least one of a SOS or an emergency call into the uninhabited aerial vehicle (UAV), the uninhabited aerial vehicle (UAV) can be ejected if there is the flight space. After ejection, at least one of the SOS or the emergency call can be delivered into the uninhabited aerial vehicle (UAV).

At least one of the SOS or the emergency call can include vehicle status information, road information, and the location information.

In order to determine whether there is a flight space for the operation of uninhabited aerial vehicle (UAV) above a vehicle, a space above the vehicle can be checked by using a space sensor placed in the top of vehicle. It can be determined whether the sensed space is equal to or larger than the flight space as well as whether there are obstructions on the sensed space by using a sensor included in the uninhabited aerial vehicle (UAV).

In the emergency handling method, the uninhabited aerial vehicle (UAV) flying above the vehicle can detect or sense signal strength of wireless communication network. The uninhabited aerial vehicle (UAV) can broadcast or send at least one of the SOS or the emergency call in the direction of the strongest signal strength. Further, the uninhabited aerial vehicle (UAV) can turn on a warning light in response to at least one of the SOS and the emergency call.

In the emergency handling method, if the signal strength of wireless communication network is equal to or below a predetermined level, the uninhabited aerial vehicle (UAV) can be translocated so as to send at least one of the SOS or the emergency call. After sending at least one of the SOS or the emergency call, the uninhabited aerial vehicle (UAV) can be replaced above the location of vehicle.

In the emergency handling method, if the signal strength of wireless communication network is equal to or below a predetermined level after translocating the uninhabited aerial vehicle (UAV), the uninhabited aerial vehicle (UAV) can broadcast or send at least one of the SOS and the emergency call in a direction of the location information included in at least one of the SOS and the emergency call.

The vehicle can be communicated with the uninhabited aerial vehicle (UAV) via a Device-to-Device (D2D) communication method or a direct communication method, not wireless communication network.

An apparatus for use in a vehicle engaged with an uninhabited aerial vehicle (UAV) can include an emergency managing unit configured to send at least one of SOS and an emergency call via a wireless communication network when emergency situation occurs, and a transmitting unit configured to deliver at least one of the SOS or the emergency call into the uninhabited aerial vehicle (UAV) if signal strength of wireless communication network is equal to or below a predetermined level.

Further, the apparatus can include a status recognition unit configured to recognize the emergency situation by using a sensor included in the vehicle, and a location information unit configured to obtain location information and state of roads by using a global positioning system (GPS) device and a navigation device.

The location information unit holds the location information based on previous GPS information if the signal strength of wireless communication network is equal to or below a predetermined level, while updating the location information based on current GPS information if the signal strength of wireless communication network is above the predetermined level.

Further, the apparatus can include a determination unit configured to control the transmitting unit according to whether an operation of uninhabited aerial vehicle (UAV) is allowed.

An uninhabited aerial vehicle (UAV) can be engaged with an emergency handling device included in a vehicle for emergency situation. The uninhabited aerial vehicle (UAV) can include a receiver configured to receive vehicle's instruction about transmitting at least one of SOS and an emergency call, a sensing unit configured to check a flight space above a vehicle, a controller configured to determine whether it is possible that the uninhabited aerial vehicle make a flight, and a transmitter configured to send at least one of the SOS and the emergency call after the uninhabited aerial vehicle is ejected.

Further, the uninhabited aerial vehicle (UAV) can include at least one of a warning light configured to emitting a light in response to at least one of the SOS and the emergency call, a location unit configured to receive a global positioning system (GPS) signal, and a camera configured to gather image information about surrounding environment.

At least one of the SOS and the emergency call can include vehicle status information, road information, and location information.

Further, the uninhabited aerial vehicle (UAV) can include a detection unit configured to sense signal strength of wireless communication network.

The transmitter can send at least one of the SOS and the emergency call in the direction of the strongest signal strength, which can be determined by the detection unit.

In the uninhabited aerial vehicle (UAV), if the signal strength of wireless communication network is equal to or below a predetermined level, the controller is configured to translocate the uninhabited aerial vehicle (UAV) to send at least one of the SOS and the emergency call and to replace the uninhabited aerial vehicle (UAV) above the location of vehicle after sending at least one of the SOS and the emergency call.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

Figure 1:
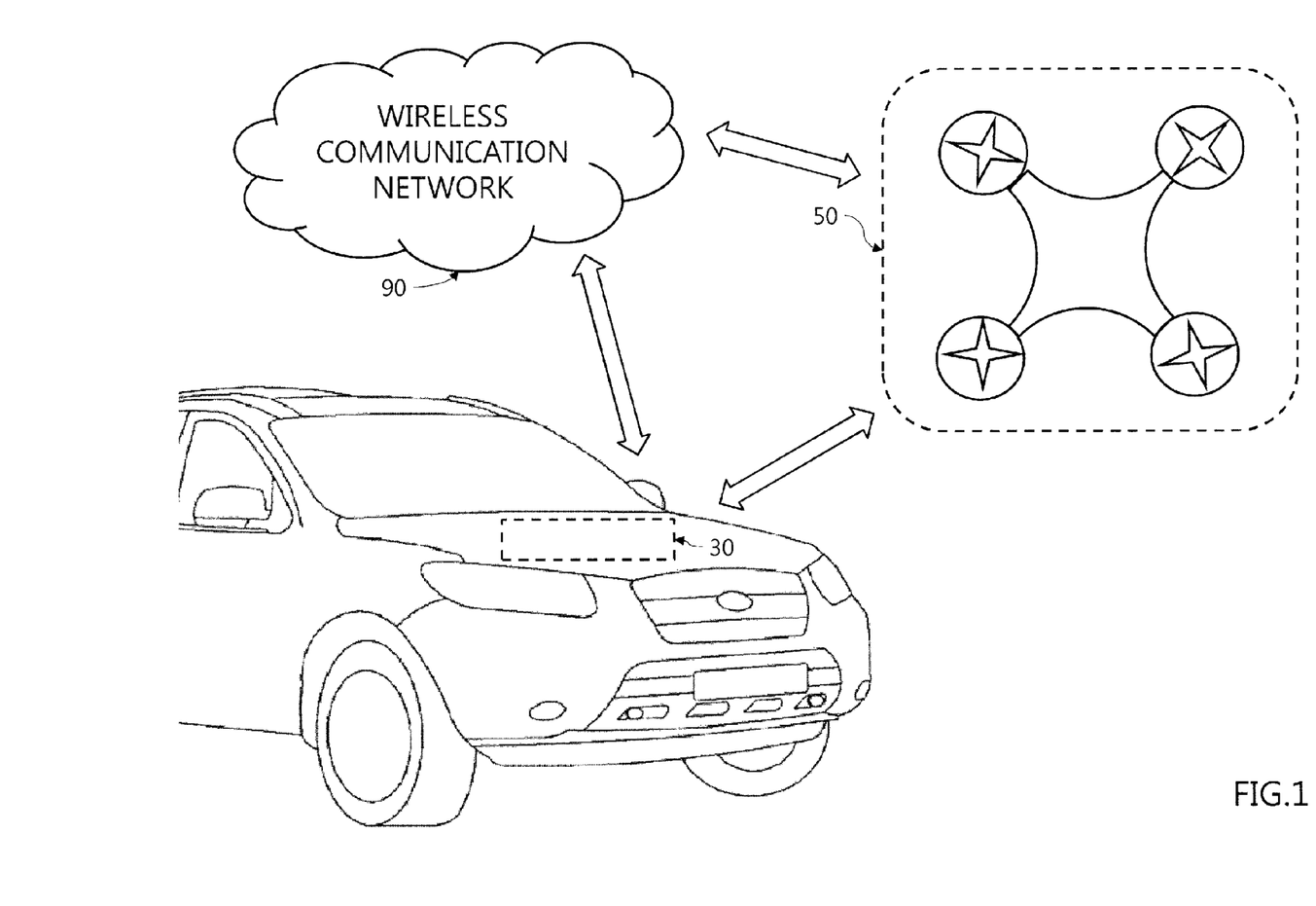
FIG. 1 shows an in-vehicle device for sending a SOS or for making an emergency call, which engages with an uninhabited aerial vehicle (UAV)

FIG. 1 shows an in-vehicle device for sending a SOS or for making an emergency call, which engages with an uninhabited aerial vehicle (UAV).

As shown, an emergency handling apparatus 30 which is considered the in-vehicle device for sending a SOS or for making an emergency call can transmit or broadcast SOS via a wireless communication network 90. Further, the emergency handling apparatus 30 can engage with the uninhabited aerial vehicle (UAV) 50 via a Device-to-Device (D2D) communication method or a direct communication method in order to deliver at least one of the SOS and the emergency call. Receiving at least one of the SOS or the emergency call, the uninhabited aerial vehicle (UAV) 50 can transmit or broadcast at least one of the SOS or the emergency call via the wireless communication network.

The uninhabited aerial vehicle (UAV) 50 commonly known as a drone is an aircraft performing a predetermined mission or duty without a human pilot aboard. The operation/flight of uninhabited aerial vehicle (UAV) 50 can be controlled either by the remote control of a pilot on the ground or in another vehicle or autonomously by onboard computers including a specifically designed computer program. Further, the uninhabited aerial vehicle (UAV) 50 can be designed in various types or shapes.

The emergency handling apparatus 30 included in the vehicle and the uninhabited aerial vehicle (UAV) 50, which access a wireless communication network, can send at least one of the SOS and the emergency call according to standards or requirements for emergency call system (eCall). By way of example but not limitation, the emergency handling apparatus 30 and the uninhabited aerial vehicle (UAV) 50 can operate based on performance, restriction or requirement guided by a standard document of 3GPP TS 22.101 describing requirements for emergency call system (eCall) to send or broadcast at least one of a SOS or an emergency call, other standard documents of 3GPP TS 26.267, 3GPP TS 26.268, 3GPP TS 26.269, 3GPP TS 26.969, and the like showing a data broadcast method for emergency call system (eCall), or the like.

Figure 2:
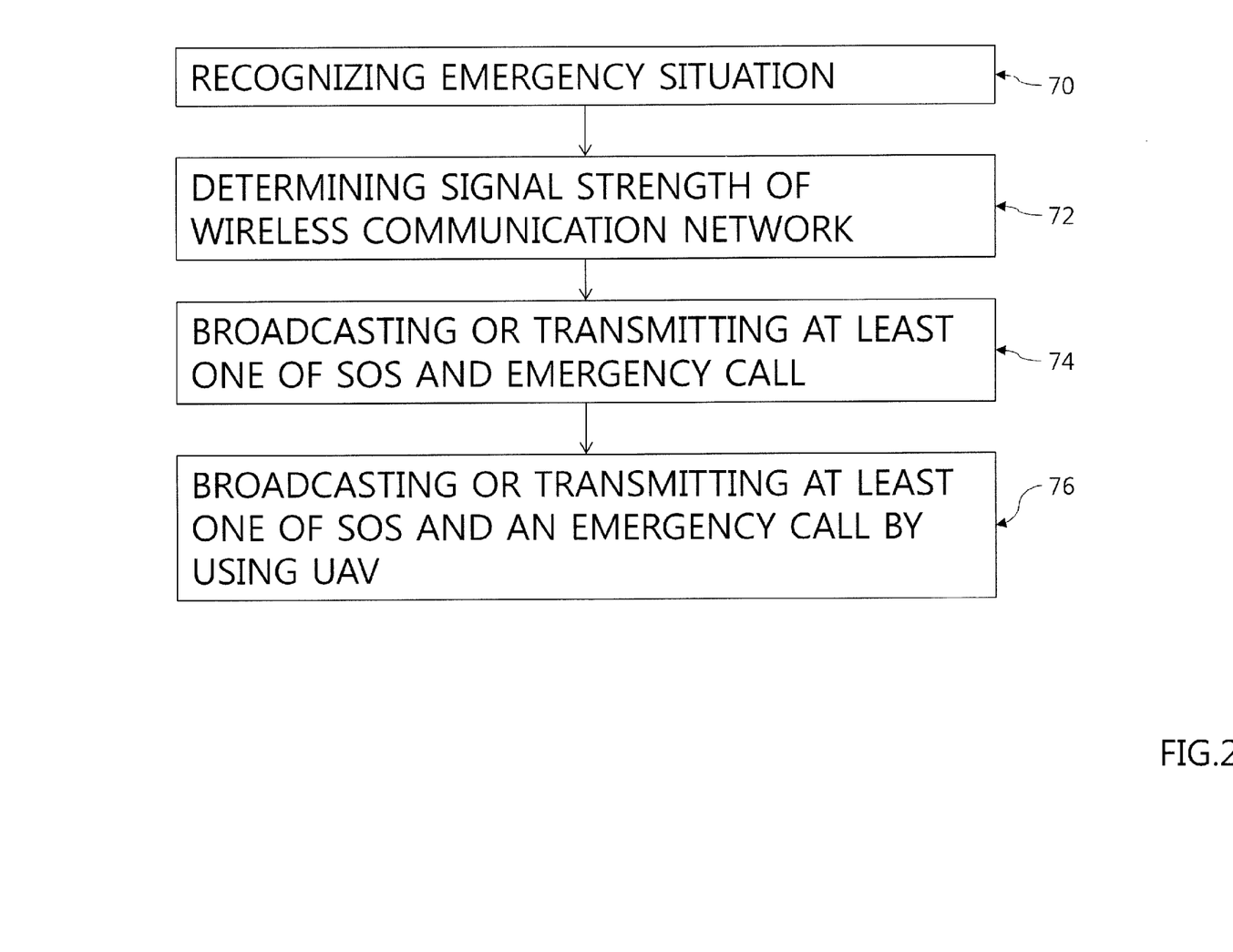
FIG. 2 describes a method for sending SOS or making an emergency call.

FIG. 2 describes a method for sending a SOS or for making an emergency call.

As shown, a method of emergency handling can be for a vehicle engaged with an uninhabited aerial vehicle (UAV). The method can include recognizing emergency situation (step 70). In step 72, signal strength of wireless communication network can be determined. In step 74, broadcast or transmission of at least one of SOS and an emergency call is performed. If the broadcast or transmission in step 74 fails, broadcast or transmission of at least one of the SOS and the emergency call can be performed by using an uninhabited aerial vehicle (UAV) (step 76).

In step 70, the emergency situation can be recognized by checking vehicle status information based on an airbag signal, a collision sensor signal, or the like. Further, vehicle status information can be obtained by an electronic system (or body electrics) monitoring vehicle operations. When a driver (or user) or a vehicle runs into danger, the emergency handling apparatus 30 shown in FIG. 1 can understand that the emergency situation occurs.

The emergency handling apparatus 30 can check or measure the signal strength of wireless communication network (step 72). If the signal strength of wireless communication network is equal to or larger than a threshold level, the emergency handling apparatus 30 can attempt to transmit or broadcast the SOS (or make the emergency call) in step 74. However, when the signal strength of wireless communication network is less than a threshold level, the SOS (or the emergency call) can be delivered by the uninhabited aerial vehicle (UAV) in step 76.

Figure 3:
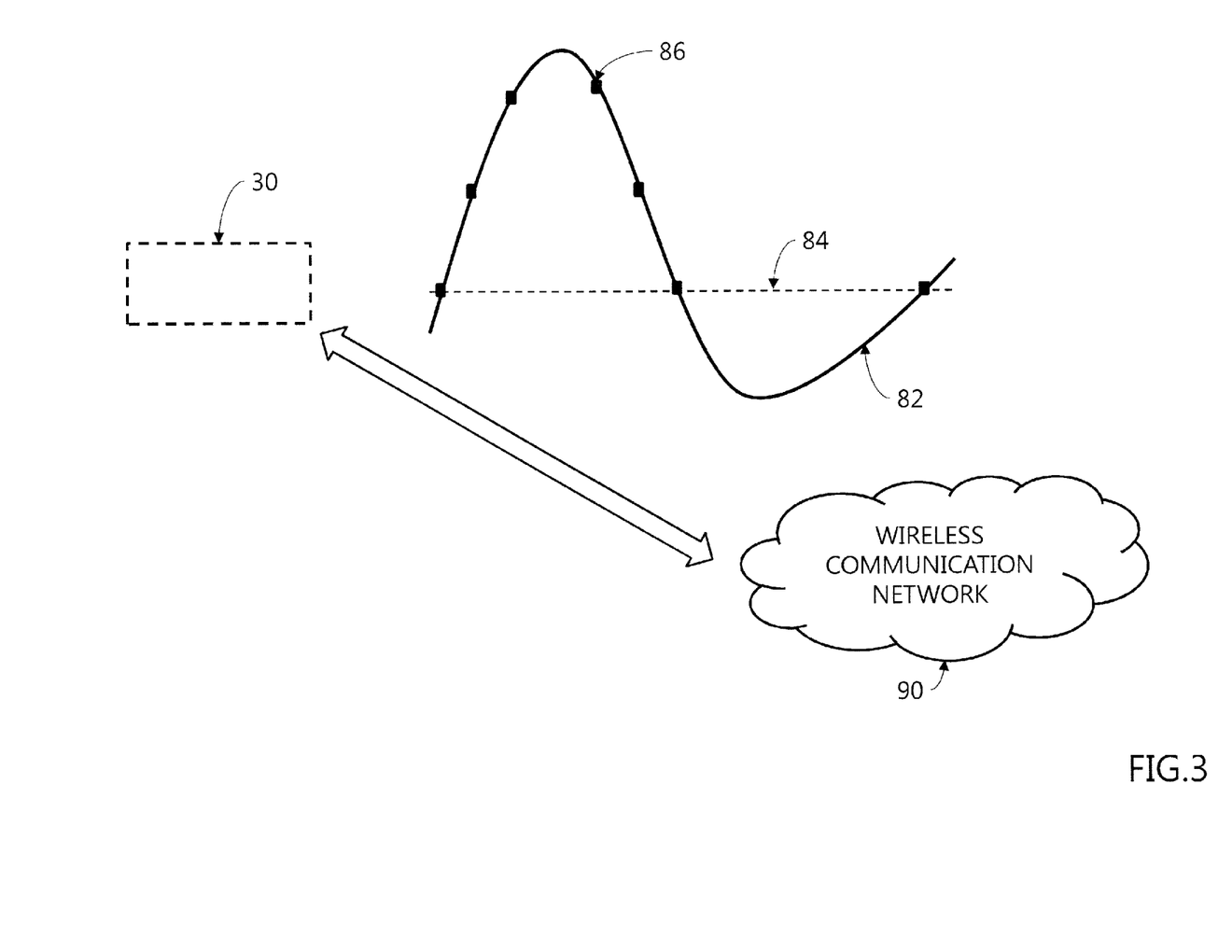
FIG. 3 shows how an apparatus for use in a vehicle stores location information.

FIG. 3 shows how an apparatus for use in a vehicle stores location information;

As shown, while a vehicle operates, the emergency handling apparatus 30 can periodically monitor signal strength of wireless communication network 90, regardless of occurrence of emergency situations. Further, the emergency handling apparatus 30 can store the monitored signal strength.

While the vehicle operates, the signal strength 82 of wireless communication network 90 can be continuously changed. According to a wireless communication environment of specific region/area that the vehicle operates, the signal strength 82 can be larger or less than a threshold level 84 supporting sound data communication. If the signal strength of wireless communication network is equal to or larger than the predetermined threshold level 84, the emergency handling apparatus 30 can periodically update the location information based on GPS information (for example, update point 86 shown in FIG. 3). However, when the signal strength 82 is less than a predetermined threshold level 84, the emergency handling apparatus 30 holds the location information based on previous GPS information.

Figure 4:
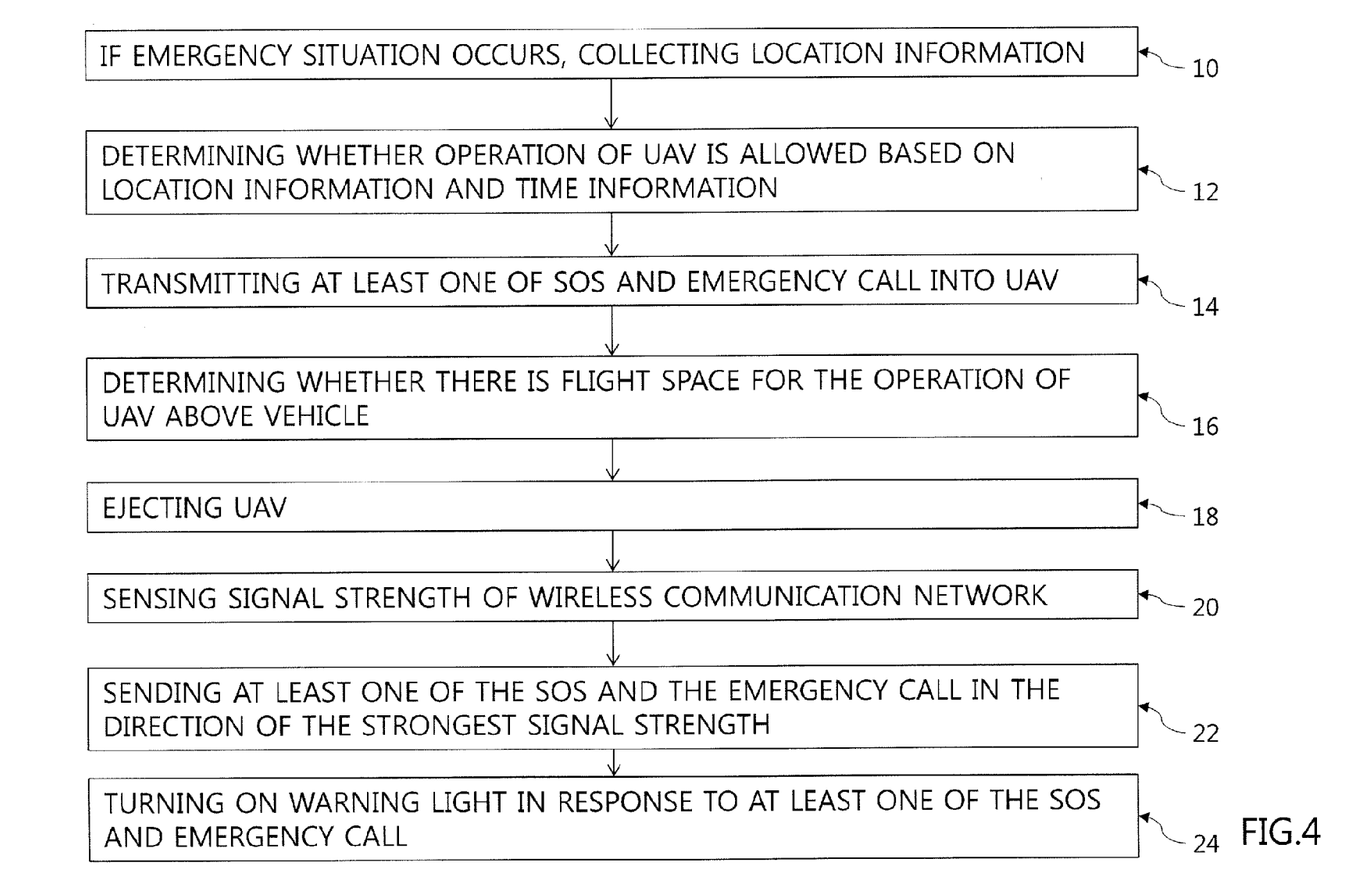
FIG. 4 shows a method for sending SOS or making an emergency call via an uninhabited aerial vehicle (UAV)

FIG. 4 shows a method for sending SOS or making an emergency call via an uninhabited aerial vehicle (UAV).

As shown, the method for sending SOS or making an emergency call via an uninhabited aerial vehicle (UAV) can include collecting location information if an emergency situations occur (step 10). In step 12, it is determined whether an operation of an uninhabited aerial vehicle (UAV) is allowed based on the location information and time information. Further, it is determined whether there is a flight space for the operation of uninhabited aerial vehicle (UAV) above a vehicle in step 14. In step 16, at least one of SOS and an emergency call can be transmitted into the uninhabited aerial vehicle (UAV).

The location information is periodically updated by a global positioning system (GPS) device. When the emergency situations occur, a vehicle can gather a vehicle's status information and the vehicle's current location. The SOS or the emergency call can include a vehicle's status information and a vehicle's current location.

When signal strength of wireless communication network which the SOS or the emergency call is transmitted is week, the SOS or the emergency call may be not delivered. By way of example but not limitation, when an emergency situation occurs at a propagation shadow region, the vehicle can determine whether operation of the uninhabited aerial vehicle (UAV) is allowed based on location information and time information. This procedure relates to regulations for operation/flight of uninhabited aerial vehicle (UAV). The operation of uninhabited aerial vehicle (UAV) can be restricted according to the location and the time of emergency occurrence. For example, it is assumed that emergency occurs at a specific area which does not permit the operation of uninhabited aerial vehicle (UAV) at night. When the vehicle determines it is night based on the time information, the vehicle cannot transmit or broadcast the SOS or make an emergency call through the uninhabited aerial vehicle (UAV).

By way of example but not limitation, the time information can be obtained by a transport protocol expert group (TPEG) device. Herein, the Transport Protocol Experts Group (TPEG) is a data protocol suite for traffic and travel related information. The TPEG can be carried over different transmission media (bearers), such as digital broadcast or cellular networks (wireless Internet). Further, via Digital Multimedia Broadcasting (DMB) frequency channels, the TPEG can show real-time traffic information, tour information, and etc. through a navigation device. For example, the TPEG can provide congestion and travel time information (CTT), safety driving information (SDI), a road event information (REI), news, point of interest, or the like. In order to transmit the SOS or make the emergency call, the vehicle can collect location information and time information from the TPEG device.

When the operation/flight of uninhabited aerial vehicle (UAV) is allowed based on the location information and the time information, at least one of the SOS and the emergency call can be delivered into the uninhabited aerial vehicle (UAV) (step 14). The vehicle and the uninhabited aerial vehicle (UAV) can communicate with each other via a Device-to-Device (D2D) communication method or a direct communication method, not a wireless communication network.

The uninhabited aerial vehicle (UAV) receiving at least one of the SOS or the emergency call can use a sensor to check whether a space for operation/flight of the uninhabited aerial vehicle (UAV) is sufficient (step 16). Autonomously operating uninhabited aerial vehicle (UAV) can include a sensor for detecting obstructions on a flight space to avoid collision while operating. The uninhabited aerial vehicle (UAV) can use the sensor to determine whether there is a flight space above the vehicle under emergency situations.

If there is a flight space, i.e., a space is sufficient for operation/flight of the uninhabited aerial vehicle (UAV), the uninhabited aerial vehicle (UAV) can be ejected (step 18). Before ejection, the vehicle can house the uninhabited aerial vehicle (UAV) at a predetermined area. For the way of example but not limitation, if the vehicle under emergency situations is located on a highway or a speedway, a space for operation/flight of the uninhabited aerial vehicle (UAV) can be sufficient. However, when the vehicle is located inside a building, ejection of uninhabited aerial vehicle (UAV) can cause another damages. Because the location information obtained by a GPS device is not sufficient for the vehicle to estimate a flight space, it may be required that a flight space should be checked by a sensor included in the uninhabited aerial vehicle (UAV) before operation/fight. As above described, after receiving at least one of the SOS and the emergency call, the uninhabited aerial vehicle (UAV) housed in the vehicle can operate or make a flight if operation/flight of uninhabited aerial vehicle (UAV) is allowed and there is a flight space above the vehicle.

After the uninhabited aerial vehicle (UAV) is ejected, the uninhabited aerial vehicle (UAV) can sense a signal strength of a wireless communication network at a space above the vehicle (step 20). When the signal strength of the wireless communication network at the space above the vehicle is equal to or larger than a threshold level, the uninhabited aerial vehicle (UAV) can send at least one of the SOS and the emergency call via the wireless communication network. By way of example but not limitation, the uninhabited aerial vehicle (UAV) can broadcast or send at least one of the SOS or the emergency call in the direction of the strongest signal strength of wireless communication network (step 22).

As not shown in FIG. 4, if the signal strength of wireless communication network is below a predetermined threshold level, the uninhabited aerial vehicle (UAV) can be translocated into another location which the signal strength is equal to or larger than the predetermined threshold level so as to send at least one of the SOS or the emergency call. After sending at least one of the SOS and the emergency call, the uninhabited aerial vehicle (UAV) can be replaced (come back) above the location of vehicle. Further, if the signal strength of wireless communication network is below a predetermined level after translocating the uninhabited aerial vehicle (UAV), the uninhabited aerial vehicle (UAV) can send or broadcast at least one of the SOS or the emergency call in a direction of the location information such as a GPS information, which can be included in at least one of the SOS and the emergency call.

The uninhabited aerial vehicle (UAV) can turn on a warning light in response to at least one of the SOS and the emergency call (step 24). The warning light included in the uninhabited aerial vehicle (UAV) can help being able to find the vehicle a long way away.

Figure 5:
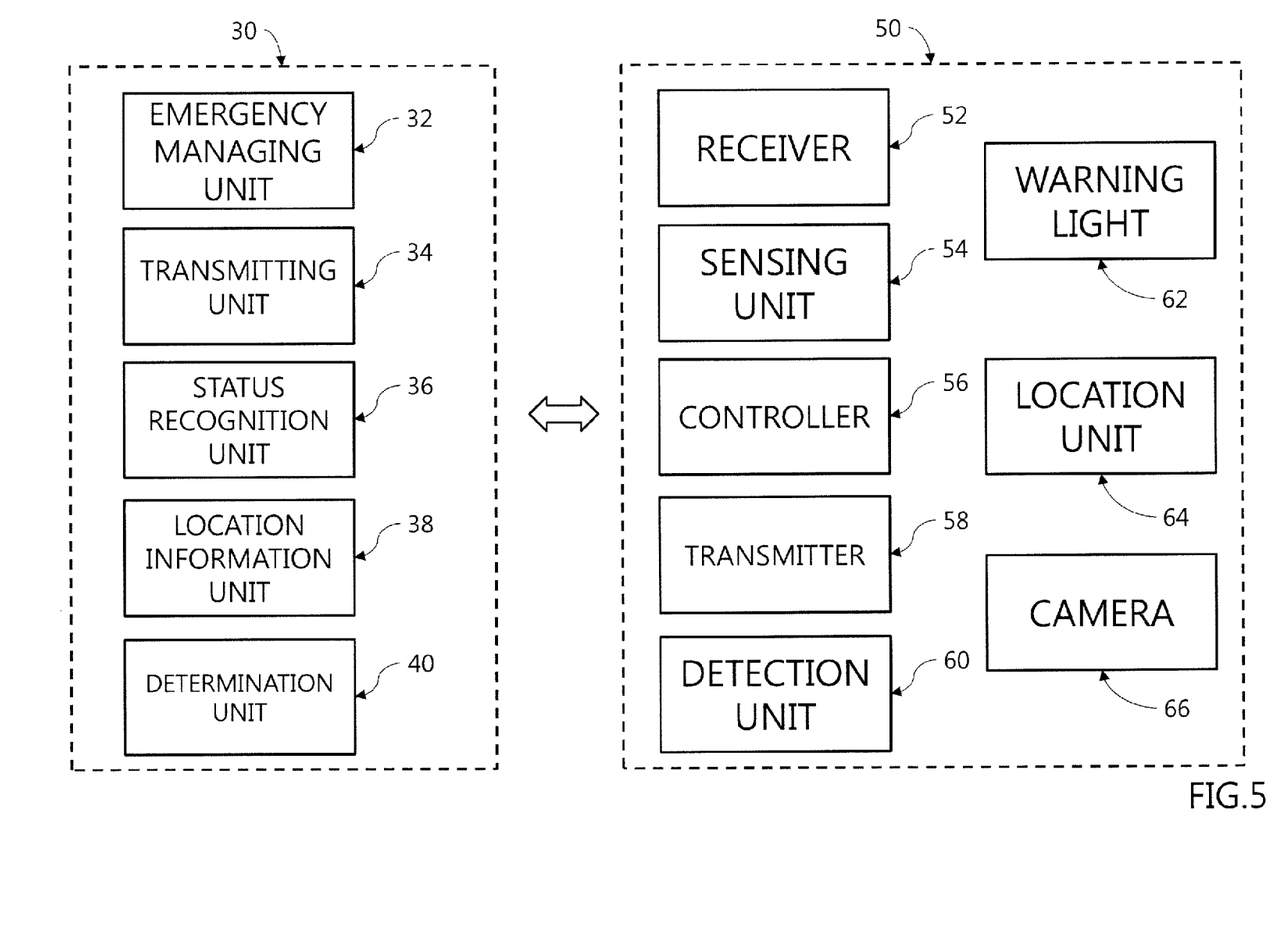
FIG. 5 describes an in-vehicle apparatus and an uninhabited aerial vehicle (UAV) for sending SOS or making an emergency call.

FIG. 5 describes an in-vehicle apparatus and an uninhabited aerial vehicle (UAV) for sending SOS or making an emergency call.

As shown, the emergency handling apparatus 30 included in a vehicle can be in communication with the uninhabited aerial vehicle (UAV) 50 via a Device-to-Device (D2D) communication method or a direct communication method, not a wireless communication network.

The emergency handling apparatus 30 for use in a vehicle can be engaged with the uninhabited aerial vehicle (UAV) 50. The emergency handling apparatus 30 can include an emergency managing unit 32 and a transmitting unit 34. When emergency situation occurs, the emergency managing unit 32 can configured to send at least one of SOS and an emergency call via a wireless communication network. If signal strength of wireless communication network is equal to or below a predetermined level, the transmitting unit 34 can deliver at least one of the SOS or the emergency call into the uninhabited aerial vehicle (UAV) 50.

Further, the emergency handling apparatus 30 can include a status recognition unit 36 and a location information unit 38. The status recognition unit 36 can recognize the emergency situation by using a sensor included in the vehicle. By way of example but not limitation, the status recognition unit 36 can use a collision detection sensor, an airbag signal, and so on. The location information unit 38 can use a global positioning system (GPS) device, a navigation device, or the like so as to obtain location information and state of roads. Various information obtained by the status recognition unit 36 and the location information unit 38 can be included in the SOS or the emergency call.

If the signal strength of wireless communication network is equal to or below a predetermined threshold level, the location information unit 38 can hold the location information based on previous GPS information. Further, the location information unit 38 can update the location information based on current GPS information if the signal strength of wireless communication network is above the predetermined threshold level.

Further, the emergency handling apparatus 30 can include a determination unit 40. The determination unit 40 can control the transmitting unit 34 according to whether operation/flight of uninhabited aerial vehicle (UAV) is allowed. By way of example but not limitation, the determination unit 40 can use the location information and the time information to check whether there are restrictions or limitations about operation/flight of uninhabited aerial vehicle (UAV).

While not shown in FIG. 5, the vehicle can include a housing unit configured to house the uninhabited aerial vehicle (UAV).

The uninhabited aerial vehicle (UAV) 50 can be engaged with the emergency handling apparatus 30 included in a vehicle for emergency situation. The uninhabited aerial vehicle (UAV) 50 can include a receiver 52, a sensing unit 54, a controller 56, and a transmitter 58. The receiver 52 can receive vehicle's instruction about transmitting at least one of SOS and an emergency call, which is delivered from the emergency handling apparatus 30. The sensing unit 54 can check a flight space above the vehicle. The controller 56 can determine whether it is possible that the uninhabited aerial vehicle (UAV) 50 make a flight. After the uninhabited aerial vehicle is ejected, the transmitter 58 can broadcast or send at least one of the SOS or the emergency call via the wireless communication network.

Further, the uninhabited aerial vehicle (UAV) 50 can include at least one of a warning light 62, a location unit 64, or a camera 66. By way of example but not limitation, the warning light 62 has a function of emitting a light (e.g., different colors or flickering/flashing periods) in response to at least one of the SOS or the emergency call. The location unit 64 can receive a global positioning system (GPS) signal so as to replace the uninhabited aerial vehicle (UAV) 50 at a space above the vehicle after the uninhabited aerial vehicle (UAV) 50 broadcasts at least one of the SOS or the emergency call. Since the location unit 64 can provide location information to the controller 56, the controller 56 can translocate the uninhabited aerial vehicle (UAV) 50 so as to broadcast or send at least one of the SOS or the emergency call and replace the uninhabited aerial vehicle (UAV) 50 above the location of vehicle after sending at least one of the SOS and the emergency call.

Further, the camera 66 included in the uninhabited aerial vehicle (UAV) 50 can take photos about the vehicle under emergency situations and surrounding environment. The transmitter 58 can broadcast collected image information about the vehicle and the surrounding environment with at least one of the SOS or the emergency call. By way of example but not limitation, throughout the wireless communication network, the transmitter 58 can send at least one of the SOS or the emergency call, GPS information of the vehicle and the uninhabited aerial vehicle (UAV) 50, or image information collected by the camera 66.

Further, the uninhabited aerial vehicle (UAV) 50 can include a detection unit 60. The detection unit 60 can sense signal strength of wireless communication network. As a result outputted from the detection unit 60, the transmitter can broadcast or send at least one of the SOS and the emergency call in the direction of the strongest signal strength.

As above described, a vehicle under emergency situation can use an uninhabited aerial vehicle (UAV) for transmitting SOS or making an emergency call so that, in the emergency call system (eCall), some issues caused by a week signal at propagation shadow region could be overcome.

The aforementioned forms are achieved by combination of structural elements and features of the invention in a predetermined manner. Each of the structural elements or features should be considered selectively unless specified separately. Each of the structural elements or features may be carried out without being combined with other structural elements or features. Also, some structural elements and/or features may be combined with one another to constitute the forms of the disclosure. The order of operations described in the forms of the disclosure may be changed. Some structural elements or features of one form may be included in another form, or may be replaced with corresponding structural elements or features of another form. Moreover, it will be apparent that some claims referring to specific claims may be combined with another claims referring to the other claims other than the specific claims to constitute the form or add new claims by means of amendment after the application is filed.

Various forms may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. A method of emergency handling for a vehicle engaged with an uninhabited aerial vehicle (UAV), the method comprising:
    collecting location information when an emergency situation occurs;
    determining whether ejection of the uninhabited aerial vehicle (UAV) from the vehicle for flying the uninhabited aerial vehicle (UAV) is allowed based on the location information and time information;
    determining whether there is a flight space for the operation of uninhabited aerial vehicle (UAV) above the vehicle; and
    transmitting at least one of a SOS or an emergency call to the uninhabited aerial vehicle (UAV).

2. The method according to claim 1, wherein the location information is periodically updated by a global positioning system (GPS) device under a predetermined condition.

3. The method according to claim 2, further comprising:
    maintaining the location information based on a previous GPS information when the signal strength of wireless communication network is equal to or below a predetermined level; and
    updating the location information based on a current GPS information when the signal strength of wireless communication network is above the predetermined level.

4. The method according to claim 1, wherein the step of transmitting at least one of the SOS or the emergency call into the uninhabited aerial vehicle (UAV) comprises:
    ejecting the uninhabited aerial vehicle (UAV) when there is flight space; and
    sending at least one of the SOS or the emergency call into the ejected uninhabited aerial vehicle (UAV).

5. The method according to claim 1, wherein at least one of the SOS or the emergency call includes vehicle status information, road information, and the location information.

6. The method according to claim 1, wherein the step of determining whether there is a flight space for the operation of the uninhabited aerial vehicle (UAV) above a vehicle includes:
sensing a space above the vehicle with a space sensor placed in the top of vehicle;
determining whether the sensed space is equal to or larger than the flight space; and
checking whether there are obstructions on the sensed space with a sensor included in the uninhabited aerial vehicle (UAV).

7. The method according to claim 1, further comprising:
at the uninhabited aerial vehicle (UAV) flying above the vehicle:
sensing signal strength of a wireless communication network;
sending at least one of the SOS or the emergency call in the direction of the strongest signal strength; and
turning on a warning light in response to at least one of the SOS or the emergency call.

8. The method according to claim 7, further comprising:
when the signal strength of the wireless communication network is equal to or below a predetermined level, translocating the uninhabited aerial vehicle (UAV) to send at least one of the SOS or the emergency call; and
replacing the uninhabited aerial vehicle (UAV) above the location of vehicle after sending at least one of the SOS or the emergency call.

9. The method according to claim 8, further comprising:
when the signal strength of the wireless communication network is equal to or below a predetermined level after translocating the uninhabited aerial vehicle (UAV), sending at least one of the SOS or the emergency call in a direction of the location information included in at least one of the SOS and the emergency call.

10. The method according to claim 1, wherein the vehicle is in communication with the uninhabited aerial vehicle (UAV) via a Device-to-Device (D2D) communication method or a direct communication method, not a wireless communication network.

11. An apparatus for use in a vehicle engaged with an uninhabited aerial vehicle (UAV), the apparatus comprising:
an emergency managing controller configured to send at least one of a SOS or an emergency call via a wireless communication network when an emergency situation occurs;
transmitter configured to transmit at least one of the SOS or the emergency call into the uninhabited aerial vehicle (UAV) when signal strength of the wireless communication network is detected to be equal to or below a predetermined level; and
an emergency apparatus controller configured to control the transmitter according to whether ejecting the uninhabited aerial vehicle (UAV) from the vehicle for flying the uninhabited aerial vehicle (UAV) is allowed based on location information and time information.

12. The apparatus according to claim 11, further comprising:
a status recognizer configured to recognize the emergency situation with a sensor included in the vehicle; and
a location information controller configured to obtain location information and a state of roads using a global positioning system (GPS) device and a navigation device.

13. The apparatus according to claim 11, wherein the location information controller is configured to maintain the location information based on previous GPS information when the signal strength of the wireless communication network is equal to or below a predetermined level, and is configured to update the location information based on a current GPS information when the signal strength of wireless communication network is detected above the predetermined level.

14. An uninhabited aerial vehicle (UAV) engaged with an emergency handling device included in a vehicle for emergency situation, the UAV comprising:
a receiver configured to receive instruction from the vehicle about transmitting at least one of an SOS or an emergency call;
a sensing unit configured to check a flight space above the vehicle;
a controller configured to determine whether to allow ejection of the uninhabited aerial vehicle (UAV) from the vehicle for flying the uninhabited aerial vehicle based on location information and time information before the uninhabited aerial vehicle is ejected; and
a transmitter configured to send at least one of the SOS or the emergency call after the uninhabited aerial vehicle is ejected.

15. The uninhabited aerial vehicle (UAV) according to claim 14, further comprising at least one of:
a warning light configured to emitting a light in response to at least one of the SOS and the emergency call;
a location unit configured to receive a global positioning system (GPS) signal; or
a camera configured to gather image information about surrounding environment.

16. The uninhabited aerial vehicle (UAV) according to claim 15, wherein at least one of the SOS or the emergency call includes vehicle status information, road information, and location information.

17. The uninhabited aerial vehicle (UAV) according to claim 14, further comprising:
a signal detector configured to sense signal strength of wireless communication network.

18. The uninhabited aerial vehicle (UAV) according to claim 17, wherein the transmitter sends at least one of the SOS or the emergency call in the direction of the strongest signal strength as determined by the signal detector.

19. The uninhabited aerial vehicle (UAV) according to claim 17, wherein when the signal strength of wireless communication network is equal to or below a predetermined level, the controller is configured to translocate the uninhabited aerial vehicle (UAV) to send at least one of the SOS or the emergency call and to replace the uninhabited aerial vehicle (UAV) above the location of vehicle after sending at least one of the SOS or the emergency call.

* * * * *